United States Patent
Blanco et al.

(10) Patent No.: US 7,406,579 B2
(45) Date of Patent: Jul. 29, 2008

(54) SELECTIVELY CHANGEABLE LINE WIDTH MEMORY

(75) Inventors: Rafael Blanco, Essex Junction, VT (US); Jack R. Smith, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/160,184

(22) Filed: Aug. 19, 2005

(65) Prior Publication Data

US 2005/0270876 A1 Dec. 8, 2005

Related U.S. Application Data

(63) Continuation of application No. PCT/US02/040427, filed on Dec. 17, 2002.

(51) Int. Cl.
*G06F 12/00* (2006.01)
(52) U.S. Cl. .................................................... 711/172
(58) Field of Classification Search ................ 711/118, 711/128, 172
See application file for complete search history.

(56) References Cited

U.S. PATENT DOCUMENTS

| 4,315,312 A | 2/1982 | Schmidt |
| 4,503,501 A | 3/1985 | Coulson et al. |
| 4,994,962 A | 2/1991 | Mageau et al. |
| 5,014,195 A | 5/1991 | Farrell et al. |
| 5,091,851 A | 2/1992 | Shelton et al. |
| 5,210,842 A | 5/1993 | Sood |
| 5,257,360 A | 10/1993 | Schnizlein et al. |
| 5,301,296 A | 4/1994 | Mohri et al. |
| 5,367,653 A | 11/1994 | Coyle et al. |
| 5,386,547 A | 1/1995 | Jouppi |
| 5,465,342 A | 11/1995 | Walsh |
| 5,586,303 A | 12/1996 | Willenz et al. |
| 5,721,874 A | 2/1998 | Carnevale et al. |
| 5,983,293 A | 11/1999 | Murakami |

OTHER PUBLICATIONS

BUR920020025EP1 Supplementary European Search Report.
"Dynamically Variable Line-Size Cache Expoliting High On-Chip Memory Bandwidth of Merged DRAM/Logic LSIs", IEEE, Jan. 9, 1999, pp. 218-222.

*Primary Examiner*—Hiep T Nguyen
(74) *Attorney, Agent, or Firm*—Lisa U. Jaklitsch

(57) ABSTRACT

The invention provides for selectively changing a line width for a memory, i.e., selecting one of a plurality of line widths for a memory. The selected line width is used in communicating with one or more processors. This provides increased flexibility and efficiency for communicating with the memory. In particular, a register can be set based on a desired line width, and subsequently used when locating data in the memory. The selected line width can be associated with each data block in the memory to allow multiple line widths to be used simultaneously. When implemented in a cache, multiple ways of the cache can be processed as a group to provide data during a single memory operation. The line width can be varied based on a task, a processor, and/or a performance evaluation.

16 Claims, 6 Drawing Sheets

PRIOR ART

FIG. 1

|   | WAY₀ | WAY₁ | WAY₂ | WAY₃ |
|---|------|------|------|------|
| 0: |   |   |   |   |
| 1: |   |   |   |   |
| 2: |   |   |   |   |
| 3: |   |   |   |   |
| 4: |   |   |   |   |
| 5: |   |   |   |   |
| 6: |   |   |   |   |
| 7: |   |   |   |   |

SELECTIVELY CHANGEABLE LINE WIDTH MEMORY

CROSS REFERENCE TO RELATED PATENT APPLICATIONS

This application is a continuation of PCT Application No. PCT/US502/040427 filed on Dec. 17, 2002.

TECHNICAL FIELD

The field of the invention is memory line width.

DESCRIPTION OF THE PRIOR ART

A cache is a type of memory used to speed up data transfer between a main memory and a processing unit. In general, a cache comprises a smaller quantity of data than the main memory. Typically, data that has been or is likely to be accessed by a processing unit (e.g., recently accessed data, neighboring data, data determined by a look ahead algorithm, etc.) is loaded into one or more data blocks in the cache from a main memory. When a main memory address is provided to the cache by the processing unit, some or all of the main memory address is used to determine if the requested data is present in the cache.

FIG. 1 depicts an illustrative cache 2 which is structurally organized into a grid of data blocks 6 (cells). The columns are referred to as ways 8 and the rows are each denoted by an index. In the illustrative cache 2, four ways 8, i.e., $way_0$ to $way_3$, and 8 rows indexed 0-7 are provided. Hence, 32 data blocks 6 are shown. Each data block 6 includes one or more words of data. A "word" is the smallest independently addressable quantity of data in a processing system. A word is generally one or more bytes (e.g., two bytes, four bytes, etc.). To ease the burden of overhead in a memory, multiple words are typically stored in each data block 6. Memory for a single task is reserved in multiples of the quantity of data stored in each data block 6.

When given a main memory address, cache 2 uses the indexes to locate the corresponding data block 6 in each way 8. Cache 2 then determines if any of the located data blocks 6 includes data for the provided main memory address. When the data is present in one of the located data blocks 6, the desired operation is performed on the data (i.e., read, write, delete, etc.). If the data is not present, the requested data can be retrieved from the main memory, loaded into one of the located data blocks 6, and the operation performed.

FIG. 2 depicts a prior art address lookup operation for a cache 2. Cache 2 is shown including N ways 8, $way_0$ to $way_{N-1}$. Each way 8 includes $2^I$ data blocks 6 that are indexed 0 to $2^I-1$. Typically, a processor provides a main memory address 4 for data to cache 2. To locate requested data, cache 2 considers main memory address 4 as having a tag portion 4A, an index portion 4B, and/or a block offset portion 4C. The relative size of cache 2 as compared to the main memory and the quantity of data 6D in each data block 6 determines the size of each address portion 4 A-C. For example, a particular main memory may comprise four mega-words ($2^{22}$ words) requiring an address that is twenty-two bits long. However, each way 8 in cache 2 may comprise only one kilo-word ($2^{10}$ words) stored in 256 data blocks of four words each. In this case, block offset portion 4C would include two bits (for locating one of four ($2^2$) words), index portion 4B would comprise eight bits (for locating one of 256 ($2^8$) data blocks), and tag portion 4A would comprise the remaining twelve bits. Index portion 4B may be located in main memory address 4 starting with the bits adjacent block offset portion 4C. Tag portion 4A comprises the remaining bits (T) of main memory address 4 that are not used in block offset portion 4C or index portion 4B. Typically, tag portion 4A comprises the bits of main memory address 4 that are assigned the highest place value ("most significant bits").

To retrieve data, cache 2 uses index portion 4B to locate a row of data blocks 6, i.e., index portion 4B is used as an index lookup 5 to be matched with an index 0-7. Cache 2 then determines if one of data blocks 6 in the located row includes data 6D for the provided main memory address 4 by comparing tag portion 4A with a tag 6A stored in each data block 6. If the correct data is present, the desired operation is performed. Block offset portion 4C comprises a number of bits (B) of main memory address 4 that are required to determine the location of data within data 6D. Typically, block offset portion 4C comprises the bits of main memory address 4 that are assigned the lowest place value ("least significant bits"). Other information such as a dirty bit 6B to indicate whether data 6D in data block 6 matches the data in main memory, and a valid bit 6C to indicate whether data block 6 has valid data can be included with each data block 6.

To load data located at a main memory address 4 into cache 2, index portion 4B is used as an index lookup 5 to a row of data blocks 6. A data block(s) 6 in one of ways 8 is selected, and the data is loaded into the data block(s) 6. When data is loaded into a data block 6, tag portion 4A is written to tag 6A of the respective data block 6. When a main memory address 4 is subsequently provided for retrieval, index portion 4B is again used as an index lookup 5 to locate a row of data blocks 6 that may contain the data. Tag portion 4A is compared with tag 6A in each located data block 6 to determine if data block 6 includes the requested data.

A "line width" is the amount of bits that are transferred in a single operation to/from memory. Typically, the line width with which data is communicated to/from cache 2 corresponds to the quantity of data 6D in data blocks 6 and is fixed. For the example above, each data block 6 includes four words. Therefore, the line width would be four words. As a result, each way 8 is accessed individually during a memory operation.

For a given memory size, a larger line width is advantageous because it requires fewer memory operations to perform data operations. For example, to read sixteen words using a line width of one word requires sixteen read operations. The same operation using a line width of four words requires only four read operations. However, when a cache is used and the line width corresponds to the size of a data block, larger data blocks may increase the likelihood that the data is not stored in the cache (i.e., a cache miss). A higher rate of cache misses causes more frequent transfers between the main memory and the cache, degrading performance. In general, a task that performs a lot of data operations and maintains a small locality of code benefits when a large line width is used, thereby lessening the number of cache operations. Conversely, when the locality of code is more diverse, and/or many tasks share a cache, a smaller line width is desirable since additional data blocks from unrelated physical addresses can be stored. Unfortunately, current technology does provide for different line widths relative to a single memory (cache). This problem exists for tasks that benefit from different line widths, and tasks that benefit from using different line widths when performing different functions. In addition, the lack of different line widths for a single cache is problematic relative to particular processor architectures, or legacy program code, that may require/expect a particular line width in order to function properly. The problem is magnified where processors and/or tasks share a memory and require/desire different line widths.

In view of the foregoing, there exists a need for a way to selectively change a line width for a memory.

SUMMARY OF THE INVENTION

The invention provides selective line width changing for a memory. The line width is used in communicating with one or more processors. This provides increased flexibility and efficiency for communicating with the memory. In particular, a register can store a value representing a selected line width, which is used when managing data in the memory. A processor can write to the register to select a line width. The line width that is used when communicating with the memory is adjusted according to the register value. The selected line width can be associated with each data block in the memory to allow multiple line widths to be used simultaneously. When implemented in a cache, data blocks in multiple ways of the cache can be processed as a group to provide data using a wider line width during a single memory operation. The line width can be varied based on a processing system, a task, a processor, and/or a performance evaluation.

The illustrative aspects of the present invention are designed to solve the problems herein described and other problems not discussed, which are discoverable by a skilled artisan.

BRIEF DESCRIPTION OF DRAWINGS

These and other features of this invention will be more readily understood from the following detailed description of the various aspects of the invention taken in conjunction with the accompanying drawings in which:

FIG. 1 depicts a prior art cache;

It is noted that the drawings of the invention are not to scale. The drawings are intended to depict only typical aspects of the invention, and therefore should not be considered as limiting the scope of the invention. In the drawings, like numbering represents like elements between the drawings.

DESCRIPTION OF THE PREFERRED EMBODIMENT

The invention provides selective changing of a line width for a memory, i.e., selecting one of a plurality of line widths for communicating with a memory. The line width can be selected based on a number of parameters including, for example, a processing system in which the memory is installed, a processor accessing the memory, a task using the memory, and/or a performance evaluation of the effectiveness with which the memory is being used. In terms of a processing system, a line width can be selected when the memory of the invention is installed in the processing system. This allows the same memory to be manufactured and installed in one of various processing systems that use different line widths. In terms of a task or processor, a line width can be selected upon loading/unloading of a task or the start/end of one of several processors accessing a shared memory. When implementing a selectively changeable line width memory in which tasks are allowed to use different line widths, the selected line width must be associated with each task. The line width can be selected when the task is loading, and saved when the task is unloading along with other task information (i.e., program counter, register information, etc.) as is known in the art. A default line width for a processing system can be used when a processor/task has not selected a particular line width. A line width can also be changed for an active task. For example, one or more compiler directives can be incorporated to allow a software developer to reconfigure the line width for certain portions of a program. For example, a SetCacheWidth #X instruction can specify a desired line width (X), while an EndCacheWidth instruction can return the selected line width to its previous size or a default size. This allows the software developer, for example, to specify a larger line width when a portion of a task is entered that will be transferring large amounts of data, and therefore would benefit from a larger line width. In terms of a performance evaluation, an operating system executing one or more tasks on a processor may detect an inefficient performance of the memory and alter the line width of an active task and/or other tasks. For example, an operating system can monitor the cache hit/miss ratio and determine that it is too high. In response, the operating system can issue a command to select a different line width for all or some of the tasks using the cache.

Figure 2:
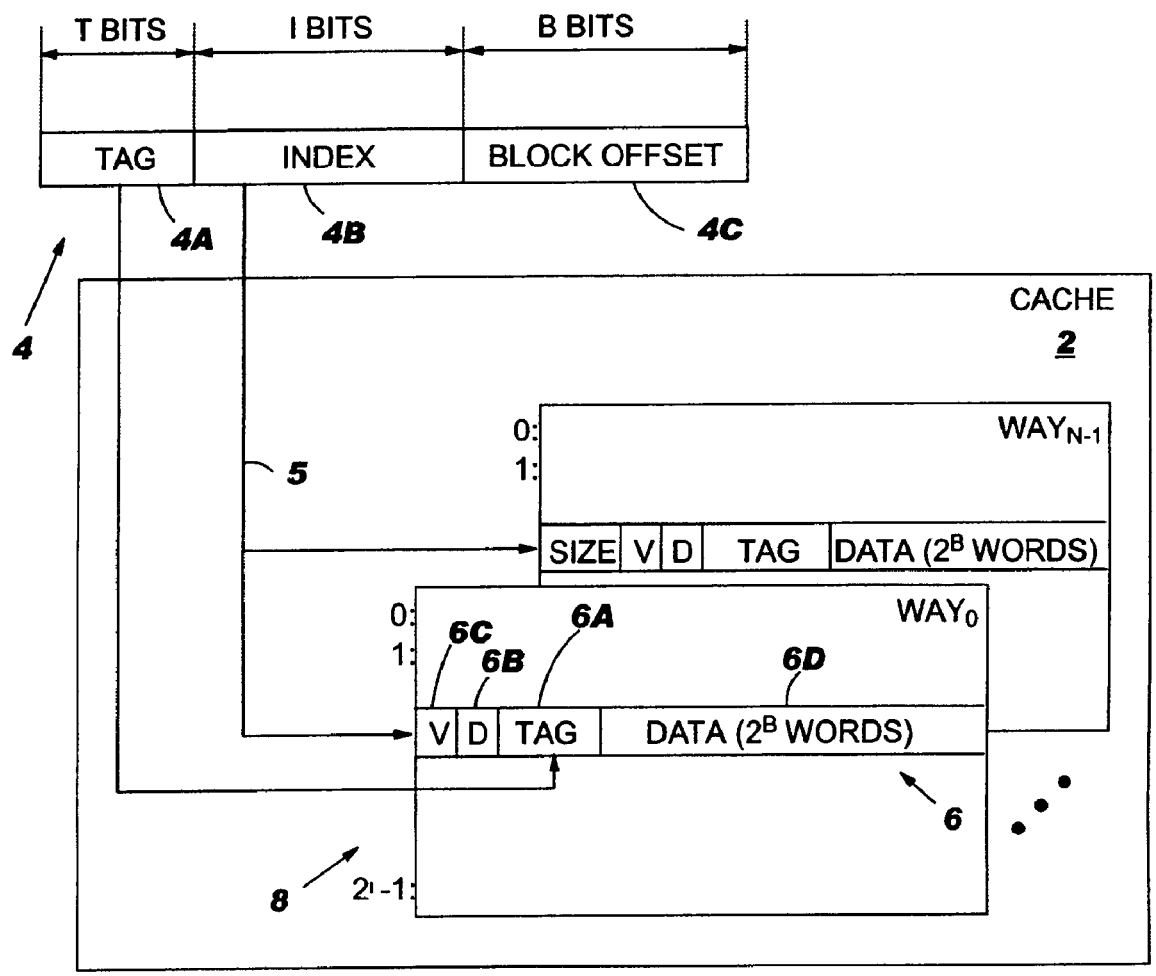
FIG. 2 depicts a prior art address lookup operation for a cache.
Figure 3:
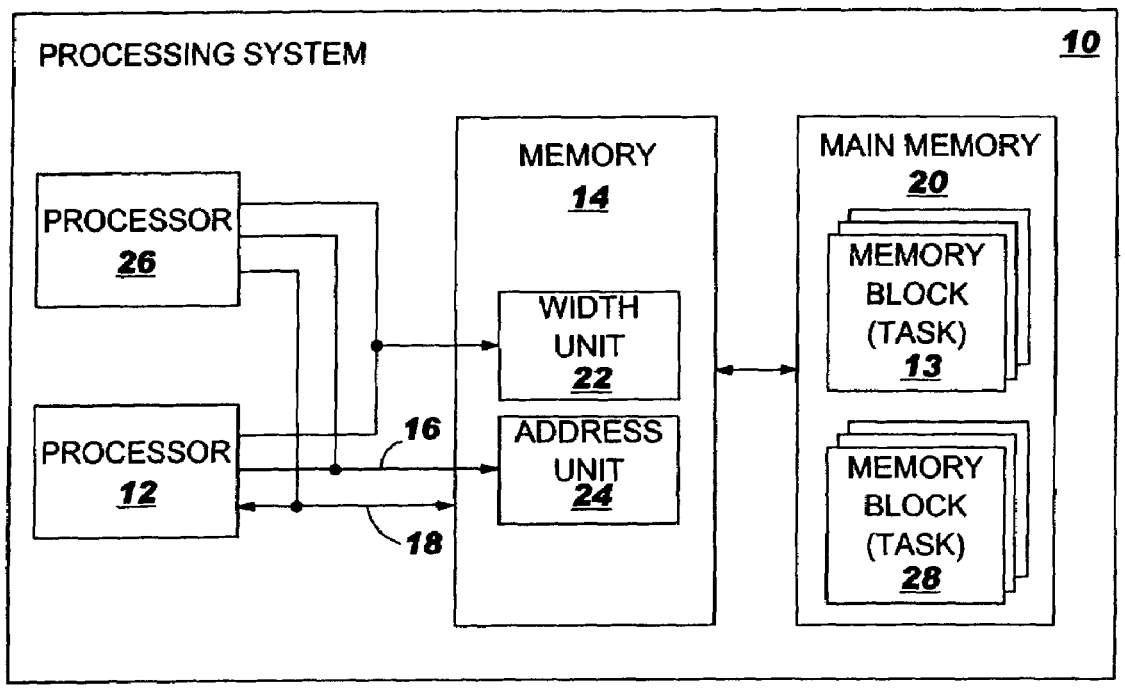
FIG. 3 depicts an illustrative system according to one embodiment of the invention.

Turning to the drawings, FIG. 3 depicts an illustrative processing system 10 implementing various features of the invention. Processing system 10 includes a processor 12 and a memory 14. In general, processor 12 performs memory operations such as read, write, delete, etc., on data stored in memory 14. To perform a desired operation, processor 12 provides an address to memory 14 using address line(s) 16. Data is communicated between processor 12 and memory 14 using data lines 18. Processor 12 can communicate the desired operation using some or all of data lines 18 or by one or more operation lines not shown.

When implemented as a cache, memory 14 stores a portion of the data stored in main memory 20. In operation, main memory 20 includes one or more memory blocks 13 reserved for one or more tasks being executed by processor 12. Processor 12 provides an address for data stored in main memory 20. Memory 14 initially determines if it contains a copy of the data based on the main memory 20 address. If so, the desired operation is performed on the data in memory 14. When the requested data is not present in memory 14, memory 14 obtains the data from main memory 20 before performing the operation. Memory 14 writes data that has been modified back to main memory 20 before deleting and/or swapping out the data for other data.

Memory 14 can communicate with processor 12 using a line width for data lines 18 that can be selectively changed. To implement a selectively changeable line width, memory 14 is shown including a width unit 22 and an address unit 24. Width unit 22 stores a line width for data lines 18 that can be selected, for example, by processor 12. Address unit 24 generates a lookup based on a provided main memory 20 address and a selected line width as described below. It is understood, that while width unit 22 and address unit 24 are included in memory 14, the functionality of units 22, 24 can be implemented within and/or apart from memory 14 using software (executed in processor 12, for example), hardware, or a combination of software and hardware. Further, it is understood that one or more additional processors, i.e., processor 26, can reserve one or more memory blocks 28 to execute one or more tasks and communicate with and perform operations on memory 14 and/or main memory 20.

Figure 4:
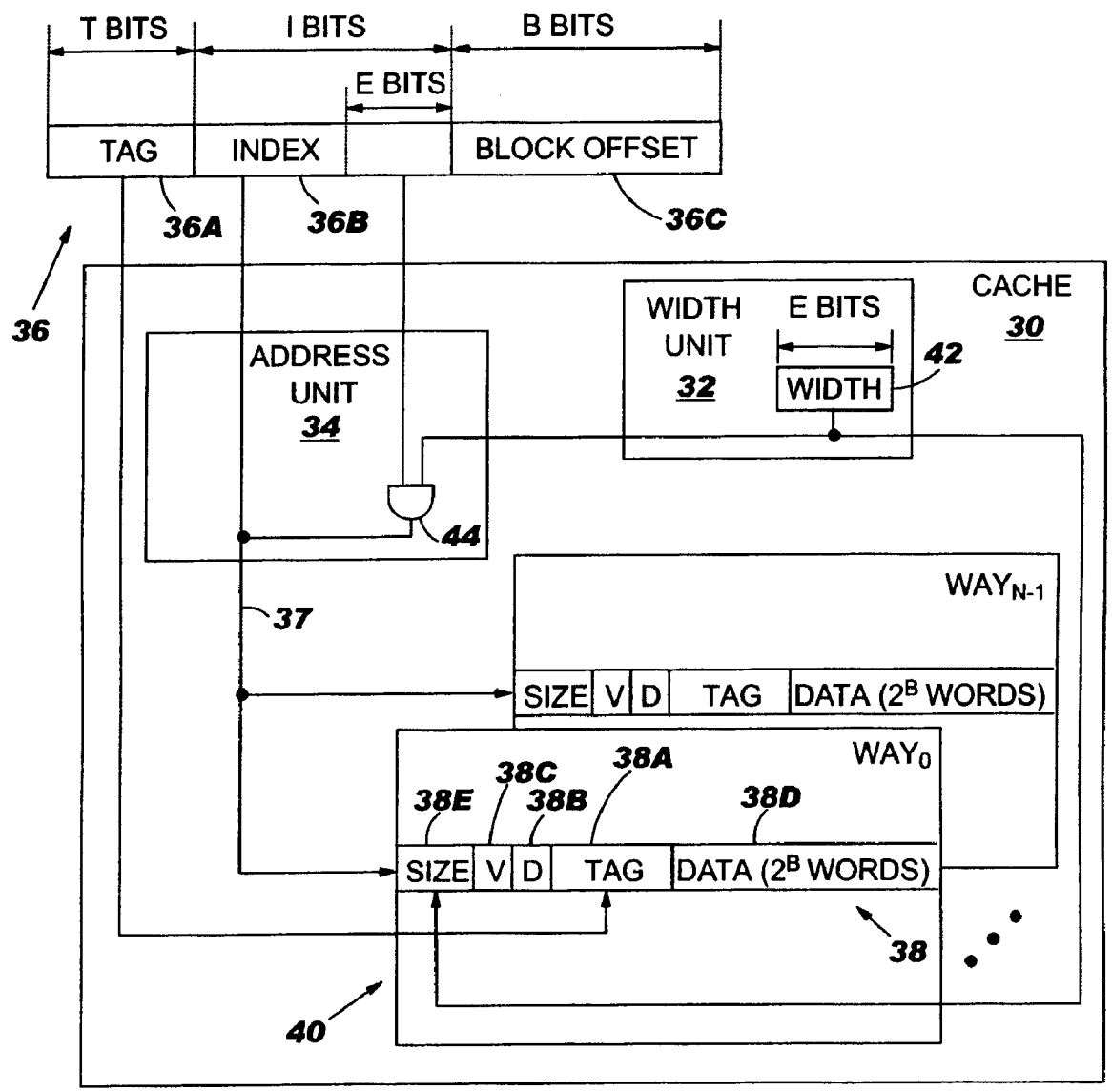
FIG. 4 depicts an address lookup operation for a cache according to an embodiment of the invention.

FIG. 4 depicts operation of an address lookup for a cache 30 according to one embodiment of the invention that allows selectively changing of the line width. When the selected line width is a multiple of the quantity of data 38D in data blocks 38, data blocks 38 located in multiple ways 40 are managed as a group. Further, the size and/or location of block offset portion 36C, index portion 36B, and/or tag portion 36A become variable based on the selected line width.

Figure 1:
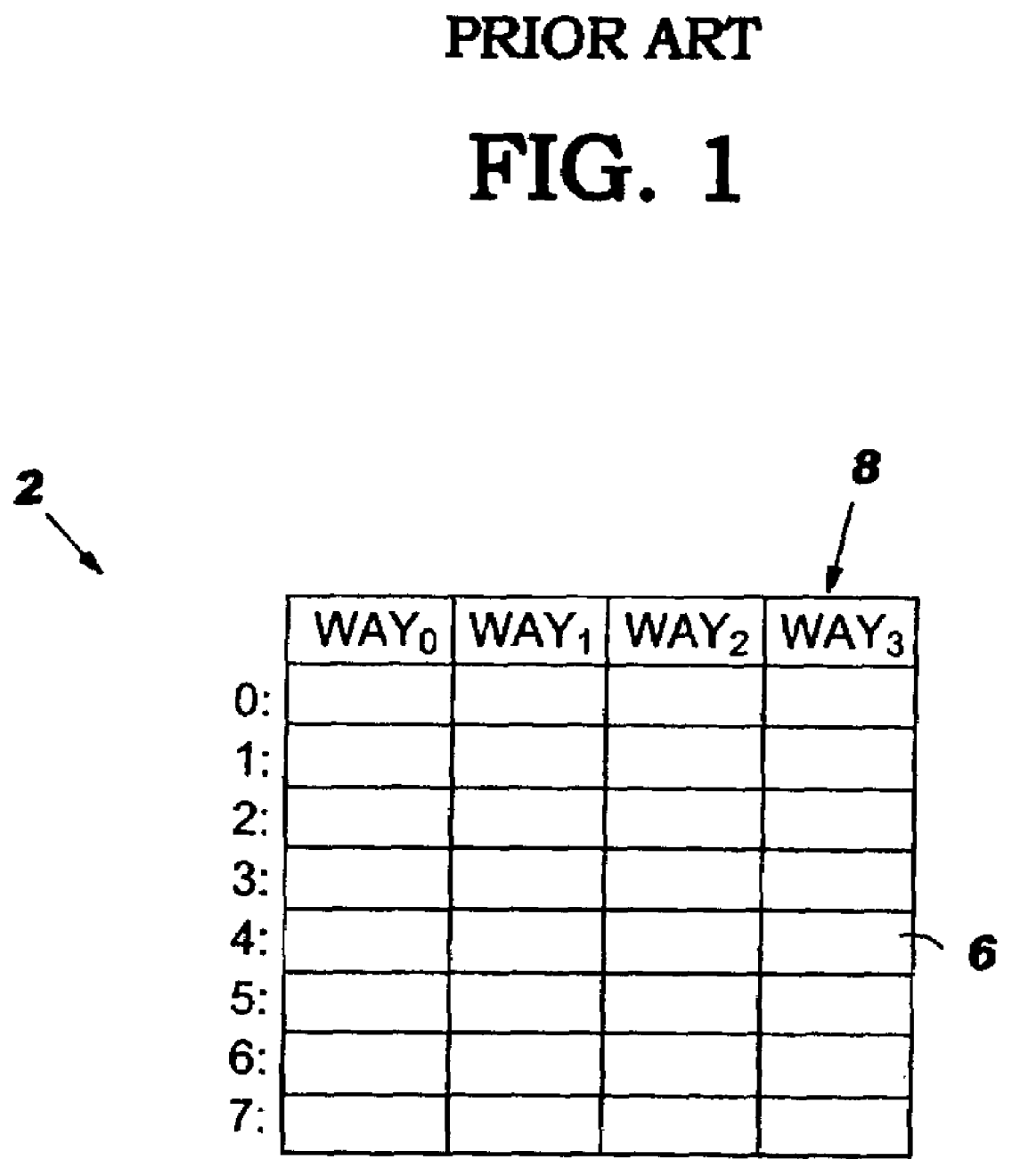

To implement line width selection, cache 30 is shown including a width unit 32. Width unit 32 includes a width register 42 that is set by a processor/task to select a desired line width. Cache 30 uses width unit 32 to determine the line width. Based on the selected line width, cache 30 manages data blocks 38 in one or more ways 40 as a single data block of varying size. For example, when width register 42 indicates a line width of $2^{B+1}$ words (two data blocks), the data blocks located at index 0 in way$_0$ and way$_1$ (FIG. 1) are managed as a single data block of twice the size.

One issue that must be addressed is that some or all of the data in cache 30 may become inaccessible and/or invalid when the line width is changed since one or more data blocks would not include the correct data and/or the data may be located in a different data block. For example, when the line width is changed from one to two data blocks, data that was previously written as a single data block cannot be retrieved as a double data block since the data block in the second way has not been written. Similarly, when the line width is changed from two data blocks to one data block, the second data block with data is located at a different index. As a result, some or all of the data in cache 30 may need to be invalidated when a new line width is selected.

To prevent invalidating all the data, a selected line width is associated with each data block 38 so that it can later be determined with which line width data block 38 was written. This allows multiple processors/tasks to simultaneously use cache 30 without requiring data in cache 30 to be invalidated with every line width change. In one embodiment, the selected line width (e.g., a value of width register 42) is associated with a data block 38 by storing it as a size 38E in data block 38. Alternatively, the value of width register 42 can be mapped to a different value corresponding to each possible line width that is stored in size 38E to associate the selected line width with data block 38. Based on the value in size 38E, it can be determined if data block 38 was written with the current line width, and whether the current line width can be used when tag portion 36A matches tag 38A stored in data block 38. When multiple data blocks 38 are managed as a group, overhead for each data block (i.e., tag 38A, dirty bit 38B, valid bit 38C) only needs to be written to the first data block 38 since the overhead for the additional data blocks 38 will only be a copy of the overhead for the first data block 38. However, the size 38E is written to all data blocks 38 in the group so that subsequent access using a different line width size recognizes the data block as used and/or invalid. Alternatively, some or all of the information can continue to be written to each data block 38. For example, dirty bit 38B can be separately updated for each data block 38 to limit the amount of data 38D copied to the main memory when data 38D in fewer than all of the data blocks 38 has been modified.

Cache 30 also includes an address unit 34 that generates a lookup 37 based on index portion 36B to locate data blocks 38. Address unit 34 modifies index portion 36B based on the selected line width to allow data in some or all of data blocks 38 to remain valid when a line width for a task/processor is modified. To select a line width, an appropriate mask is written to width register 42. Width register 42 includes the number of bits (E) that correspond to the maximum number of bits of index portion 36B that are masked out (set to zero) when the maximum line width (i.e., the maximum number of data blocks) is selected. In other words, for a cache having N ways, width register 42 would comprise up to $\log_2(N)$ bits (E). Address unit 34 includes a logical AND gate 44. AND gate 44 is used to logically combine the least significant E bits of index portion 36B with the contents of width register 42. The result is then combined with the remainder of index portion 36B to generate lookup 37. Lookup 37 is then used to locate data blocks 38 in ways 40 that may contain data for main memory address 36.

The illustrative table below provides the values of width register 42 when a maximum of eight data blocks can be selected. As can be seen in row 1, when a line width of one data block is selected, all I bits of index portion 36B are used so that each data block can be individually accessed. Starting with the least significant index bit, an additional index bit is masked out (set to zero) each time the line width is doubled. Consequently, the resulting lookup 37 accesses evenly indexed data blocks in row two, and every fourth data block in row three. When a line width of eight data blocks is selected (last row), the least significant three bits of index portion 36B are masked out resulting in every eighth data block being accessed. The masked out index bit(s) (rows two through four) are required to determine which data block 38 of the group includes the desired data in data 38D. As a result, the masked bits of index portion 36B can be considered as a part of block offset portion 36C (i.e., the size of block offset portion 36C increases by the number of masked out bits).

| Width Register Value (Most Significant Bit to Least Significant Bit) | Number of Index Bits Used | Line Width |
|---|---|---|
| 111 | I | one data block ($2^B$ words) |
| 110 | I-1 | two data blocks ($2^{B+1}$ words) |
| 100 | I-2 | four data blocks ($2^{B+2}$ words) |
| 000 | I-3 | eight data blocks ($2^{B+3}$ words) |

Figure 5:
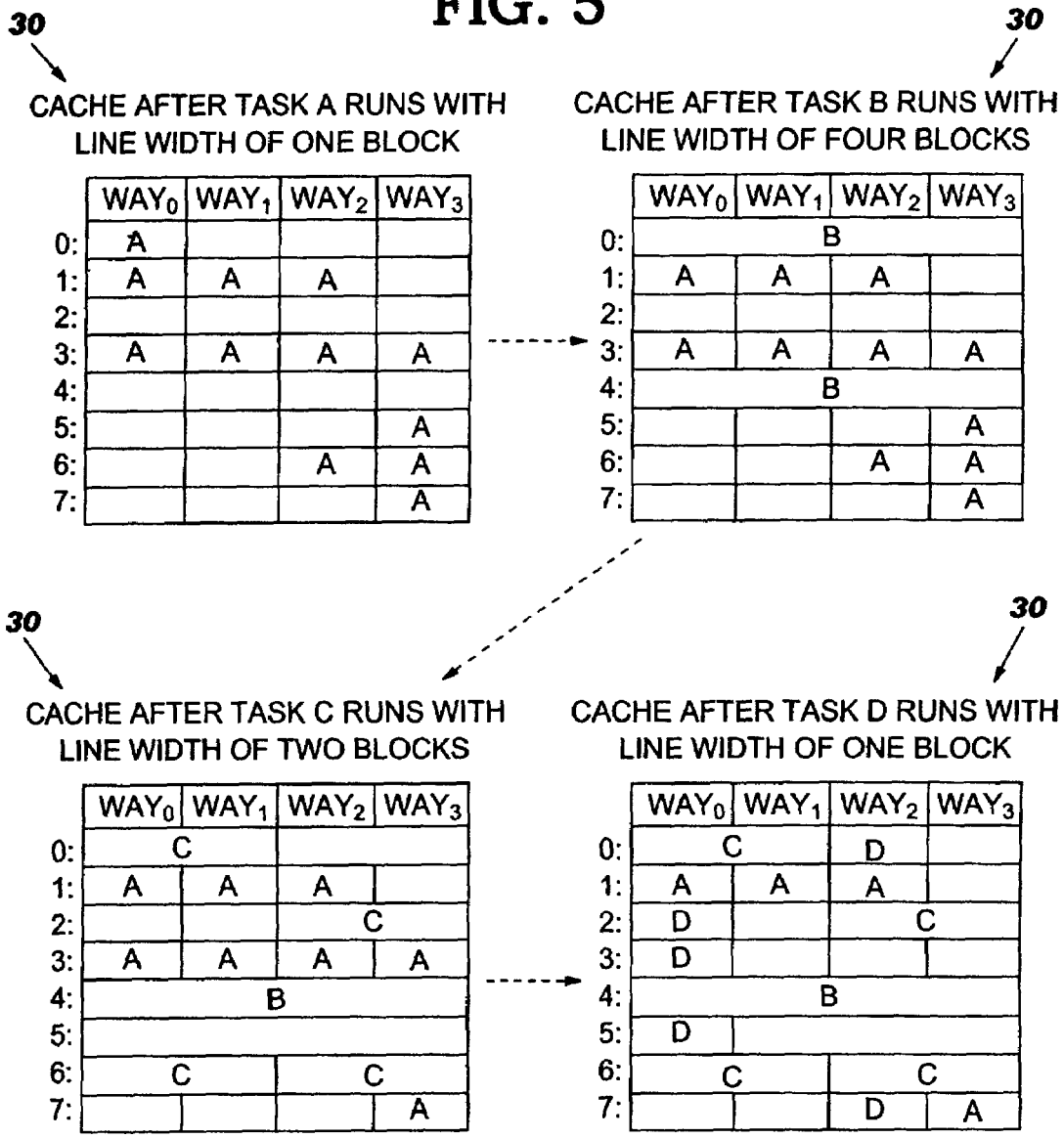
FIG. 5 depicts an illustrative portion of a cache after various tasks have executed.

Referring to FIG. 5 in conjunction with FIG. 4, an illustrative portion of cache 30 after the execution of each one of four tasks A-D is depicted. The illustrative portion includes four ways 40 (way$_0$ through way$_3$), each having eight data blocks 38 (shown as cells in FIG. 5) that are indexed 0-7. Cache 30 is initially shown after task A has executed. Because task A uses a line width of one data block 38 (i.e., each way is managed independently), width register 42 is set to all ones so that all I bits of index portion 36B are used in generating lookup 37 for locating data blocks 38. As a result, task A may write data to any data block 38 located in any way 40.

Task B uses a line width of four data blocks (four ways). Consequently, each time task B reads data from cache 30, data 38D at all data blocks at a given index are communicated (i.e., way$_0$ through way$_3$). Further, since task B communicates with cache 30 using a line width of four data blocks 38, the least significant two bits of width register 42 are set to zero as discussed above. As a result, address unit 34 sets the least significant two bits of index portion 38B to zero when generating lookup 37 for task B to allow for the line width to be varied for a task without invalidating all the data in cache 30 for the task. Therefore, task B is limited to writing data to data blocks 38 at indexes 0 and 4 in the portion of cache 30 shown.

Task C uses a line width of two data blocks 38 (two ways). As a result, the least significant bit of width register 42 is set to zero so that address unit 34 sets the least significant bit of index portion 38B to zero when generating lookup 37 for task C. After task C executes, a portion of one of task B's entries was swapped out (i.e., data block 0 of way$_0$ and way$_1$). As a result, the remainder of task B's data is invalid, and can no longer be accessed by task B.

After task C executes, data blocks 38 for tasks A, B, and C remain valid and can be accessed by each task using the unique line width for each task since they have not been swapped out for the other tasks. Similarly, after task D runs with a line width of one data block 38, numerous data blocks 38 used by tasks A and C remain valid. However, only one data block 38 used by task B remains valid since the data at index 0 for task B has been swapped out. Also, task A data at data blocks 38 at index 3 in all ways is invalidated once task D overwrites the data for task A at index 3 in way$_0$. Cache 30 depicts the trade off that is obtained with small line widths (more likely hit) versus large line widths (fewer operations). Further, as shown, cache 30 is capable of simultaneously storing data for multiple tasks that incorporate varying line widths, thereby increasing the efficiency with which cache 30 is utilized.

When a line width for an active task can be varied, data blocks 38 containing data for the active task may become invalid as discussed above. To ensure an efficient transition between line widths, cache 30 can be run in a "store through" mode. In store through mode, cache 30 writes any modified data to the main memory without waiting for a task swap, or the data to be swapped out. This allows data blocks 38 to be marked as invalid without potentially requiring numerous writes to the main memory before this occurs. Still further, when the index portion 36B is masked based on the line width, portions of the data in ways 40 may remain valid when the line width for a task is varied. Portions of the data for the task are stored at the same location for different line widths. For example, after task B runs in FIG. 5, if task B were changed to a line width of two data blocks (two ways), task B data at data blocks 38 at indexes 0 and 4 of way$_0$ and way$_1$ would remain valid and usable. As a result, this data would not require being marked as invalid, requiring a load operation from the main memory.

Returning to FIG. 4, instead of masking bits in index portion 36B, address unit 34 can provide index portion 36B as lookup 37 to locate data blocks 38. This may be desirable when width register 42 is varied based on processors using different addressable word sizes. For example, a processor having one byte words can use a line width of one data block 38 (one way 40), and share cache 30 with a processor having two byte words using a line width of two data blocks 38. In this configuration, the one byte-addressable processor would have N possibilities of a data hit (one possibility for each way 40), while the two byte-addressable processor would have N/2 possibilities of a data hit (one possibility for each pair of ways 40).

It is understood that tag 38A can include a copy of tag portion 36A, or any data capable of matching a specified main memory address 36 with data stored in one or more data blocks 38. Further, it is understood that main memory address 36 may include some or all of the portions 36A-C depicted. For example, when each data block 38 is the size of one word, block offset portion 36C is zero bits (i.e., not included). Additionally, the locations of index portion 36B and block offset portion 36C in main memory address 36 could be reversed depending on how data is stored/accessed in cache 30.

Figure 6:
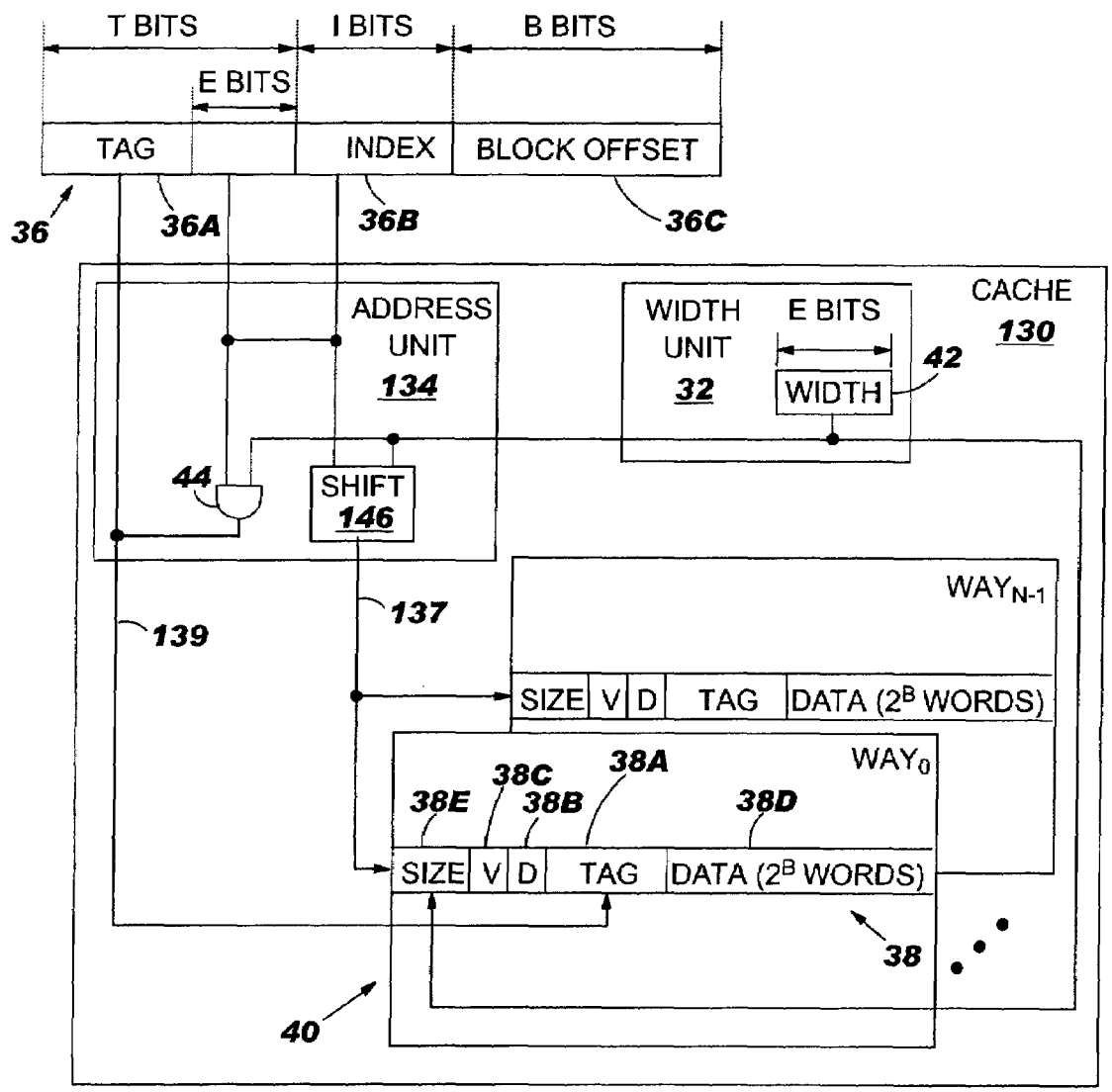
FIG. 6 depicts an address lookup operation for a cache according to another embodiment of the invention.

FIG. 6 depicts an alternative cache 130 according to another embodiment of the invention. Cache 130 allows access to all data blocks 38, regardless of the selected line width size. As a result, tasks/processors using larger line widths can access all data blocks 38 in cache 130 rather than a limited number of data blocks 38 as discussed with reference to FIG. 4. In cache 130, index portion 36B is located in main memory address 36 based on a selected line width. Width unit 32 includes a width register 42 that operates the same as described above with reference to FIG. 4. Address unit 134 includes a logical AND gate 44 to generate a tag 139 that is compared to and stored as tag 38A in data blocks 38, and a shift circuit 146 to generate lookup 137 for locating data blocks 38.

All I bits of index portion 36B and the least significant E bits of tag portion 36A are provided to shift circuit 146 along with the value of width register 42. Based on the value of width register 42, the bits provided are shifted right zero or more bits. For example, the combined index portion 36B bits and least significant E bits of tag portion 36A can be shifted right one bit for each bit in width register 42 that has a value of zero (masked out). Once shifted, the least significant I bits that remain are used as lookup 137 to locate data blocks 38. As a result, lookup 137 always includes I bits that have not been masked out, and therefore all indexes for data blocks 38 are accessible. Any bits shifted right may be subsequently used as part of block offset portion 36C as discussed above.

The least significant E bits of tag portion 36A are also provided to AND gate 44 and masked using width register 42. The masked bits are then combined with the remaining bits of tag portion 36A to generate tag 139. Tag 139 is compared with and/or copied to tag 38A. This causes the least significant bits of tag portion 36A that have been right shifted and used in lookup 137 to be zeroed before being used as part of the tag. As a result, when a main memory address 36 is provided, the bits are not used twice, i.e., once as a part of lookup 137, and then as a part of tag 139.

It is understood that various alternatives to the two embodiments are possible. For example, address unit 134 and/or width unit 32 shown in FIG. 6 can include circuitry and/or software that switches operation between the various embodiments discussed. For example, width unit 32 can include a register to select a word size. Based on this selection and the value of width register 42, operation of address unit 134 can be altered. The selected word size may also be associated with each data block 38 in a manner similar to size 38E (i.e., stored with each data block 38). Incorporation of this functionality allows tasks executing on processors using different addressable word sizes to select various line width sizes. Further, it is understood that masking main memory address 36 bits is not required. For example, the address lookup operation can ignore unnecessary bits.

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. The method of managing a memory that communicates using a line width, the method comprising the steps of: selectively changing the line width; and transferring data in a memory operation, wherein a quantity of data transferred is based on the selected line width, further comprising: associating a line width with a task; selecting the line width when loading the task; and saving the line width when unloading the task.

2. The method of claim 1, wherein the line width is selected based on at least one of: a processor, a task, and a performance evaluation.

3. The method of claim 1, wherein transferring data includes: providing a main memory address to the memory; generating a lookup based on the main memory address and the line width; and transferring data from at least one data block located in the memory using the main memory address and the lookup.

4. The method of claim 1, further comprising associating the line width with the data.

5. The method of claim 4, wherein the memory includes a first data block associated with a first line width and a second data block associated with a second line width different from the first line width.

6. The method of managing a memory that communicates using a line width, the method comprising the steps of: selectively changing the line width; and transferring data in a memory operation, wherein a quantity of data transferred is based on the selected line width, further comprising varying a line width for an active task.

7. The method of claim 6, wherein the line width is selected based on at least one of: a processor, a task, and a performance evaluation.

8. The method of claim 6, wherein transferring data includes: providing a main memory address to the memory; generating a lookup based on the main memory address and the line width; and transferring data from at least one data block located in the memory using the main memory address and the lookup.

9. The method of claim 6, further comprising associating the line width with the data.

10. The method of claim 9, wherein the memory includes a first data block associated with a first line width and a second data block associated with a second line width different from the first line width.

11. The processing system comprising: a memory that includes a plurality of data blocks; a processor in communication with the memory; and a width unit that stores a line width selected by the processor; wherein a quantity of data communicated from the data blocks during a memory operation is based on the line width, further comprising means for varying the line width of an active task.

12. The system of claim 11, further comprising means for associating the line width with at least one of: a task and a processor.

13. The system of claim 11, further comprising a main memory, wherein the memory includes data copied from the main memory.

14. The system of claim 11, further comprising an address unit that generates a lookup for locating at least one data block in the memory, wherein the lookup is based on the line width and an index portion of a main memory address.

15. The system of claim 14, wherein the address unit further generates a tag for matching a data block with the main memory address, wherein the tag is based on the line width and the memory address.

16. The system of claim 15, wherein the index portion is located in the main memory address based on the line width, and wherein the tag portion is masked based on the line width to generate the tag.

* * * * *